(12) United States Patent
Henry

(10) Patent No.: US 7,939,759 B2
(45) Date of Patent: May 10, 2011

(54) CABLE PROTECTOR WITH REMOVABLE DIVIDERS

(76) Inventor: Stephen K. Henry, Boulder, CO (US)

( * ) Notice: Subject to any disclaimer, the term of this patent is extended or adjusted under 35 U.S.C. 154(b) by 490 days.

(21) Appl. No.: 12/107,149

(22) Filed: Apr. 22, 2008

(65) Prior Publication Data

US 2009/0260846 A1    Oct. 22, 2009

(51) Int. Cl.
*H02G 3/04* (2006.01)
*H02G 3/00* (2006.01)

(52) U.S. Cl. ......... 174/68.1; 174/97; 174/503; 174/101; 248/68.1; 52/220.7; D13/155

(58) Field of Classification Search .................. 174/480, 174/481, 68.1, 68.3, 101, 97, 95, 135, 70 R, 174/72 C, 72 A, 99 R, 70 C, 484; 220/3.2, 220/3.3; 248/74.1, 74.2, 68.1; 14/69.5; 104/275; 138/103, 105, 106, 110, 115, 157; 52/220.1, 52/220.3, 220.5, 220.7; 439/557, 451, 449; 211/184, 11

See application file for complete search history.

(56) References Cited

U.S. PATENT DOCUMENTS

| | | | | |
|---|---|---|---|---|
| 3,697,667 A | * | 10/1972 | Pollak et al. ................. | 174/68.3 |
| 3,905,484 A | * | 9/1975 | Dean et al. .................... | 211/184 |
| 4,629,826 A | * | 12/1986 | Thomas ........................ | 174/68.3 |
| 5,089,667 A | * | 2/1992 | Goussin et al. ............... | 174/101 |
| 5,095,822 A | * | 3/1992 | Martin .......................... | 174/101 |
| 5,154,299 A | * | 10/1992 | Hwang ......................... | 211/184 |
| 5,267,367 A | * | 12/1993 | Wegmann, Jr. ............... | 52/220.5 |
| 5,777,266 A | | 7/1998 | Herman et al. | |
| 5,784,841 A | * | 7/1998 | Nowell ......................... | 52/220.5 |
| 6,005,187 A | * | 12/1999 | Navazo ......................... | 174/481 |
| 6,202,565 B1 | | 3/2001 | Henry | |
| 6,481,036 B1 | | 11/2002 | Duvall | |
| 6,528,728 B1 | | 3/2003 | Shima | |
| 6,646,203 B1 | * | 11/2003 | Liao ............................... | 174/97 |
| 6,747,212 B1 | | 6/2004 | Henry | |
| 6,972,367 B2 | * | 12/2005 | Federspiel et al. ............ | 174/481 |
| 7,145,079 B1 | | 12/2006 | Henry | |
| 7,531,746 B2 | * | 5/2009 | Henry ........................... | 174/68.1 |
| 7,592,547 B2 | * | 9/2009 | Lubanski ....................... | 174/101 |
| 7,635,812 B2 | * | 12/2009 | Cardi ........................... | 174/72 A |
| 2007/0095561 A1 | | 5/2007 | Lubanski | |
| 2007/0144778 A1 | | 6/2007 | Henry | |

FOREIGN PATENT DOCUMENTS

DE    198 10 554 C1    10/1999

* cited by examiner

*Primary Examiner* — Angel R Estrada
(74) *Attorney, Agent, or Firm* — Dorr, Carson & Birney, P.C.

(57) ABSTRACT

A cable protector includes a channel recessed into, and extending along the upper surface of a base. A number of dividers can be removably inserted into the channel from above to divide the channel into a plurality of tracks for carrying cables that can be inserted from above. Alternatively, a removable tray with a desired number of dividers can be placed as a unit in the channel, instead of inserting individual dividers. A lid covers the channel and dividers to provide a surface for traffic over the cable protector. Sets of complementary fasteners, such a tabs and keyed slots, can be employed to removably secure the dividers in the channel of the cable protector.

10 Claims, 19 Drawing Sheets

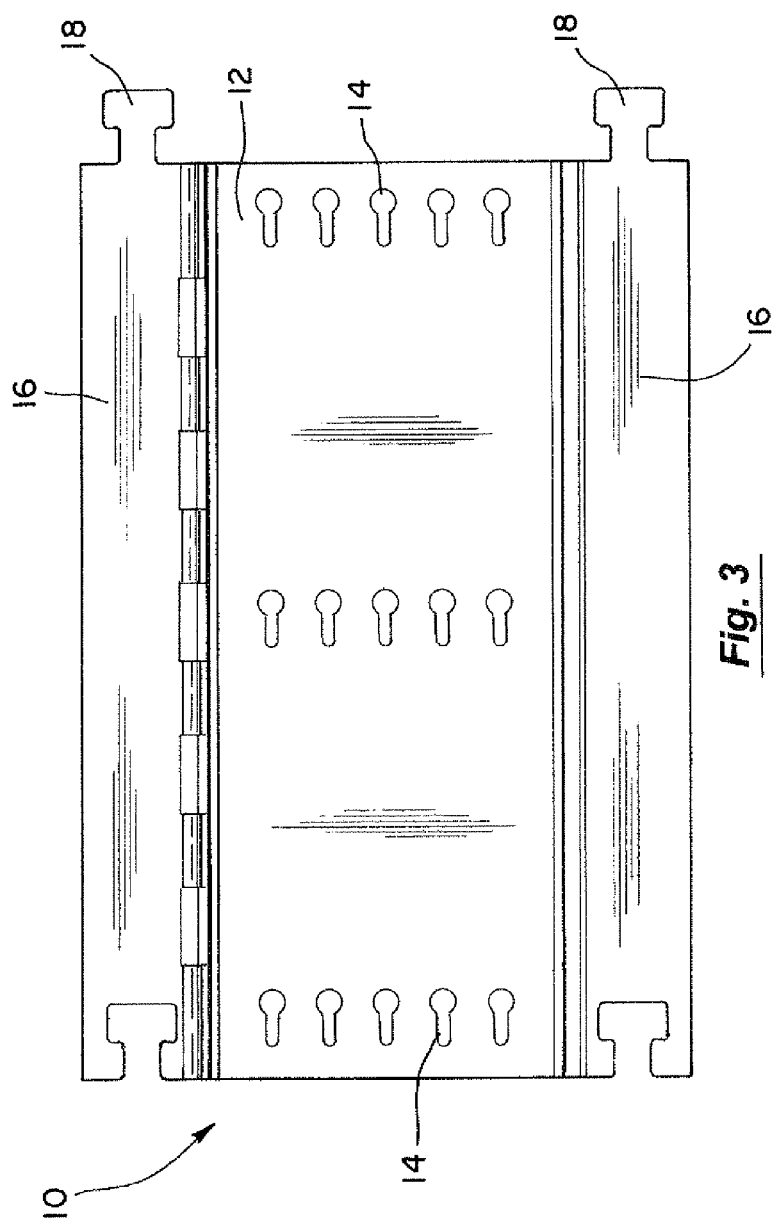
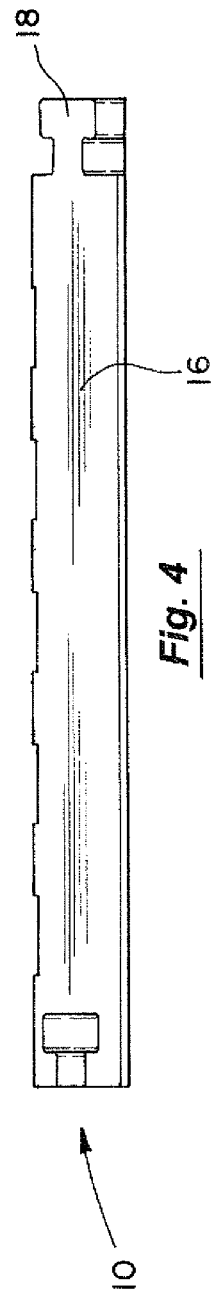
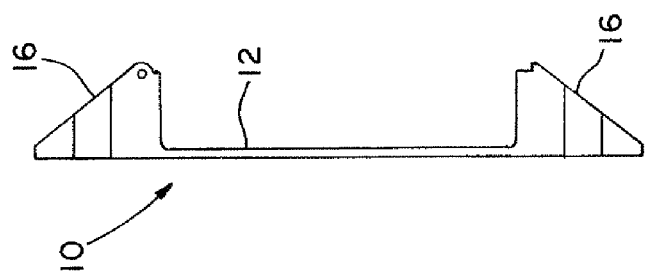
Fig. 3
Fig. 4
Fig. 5

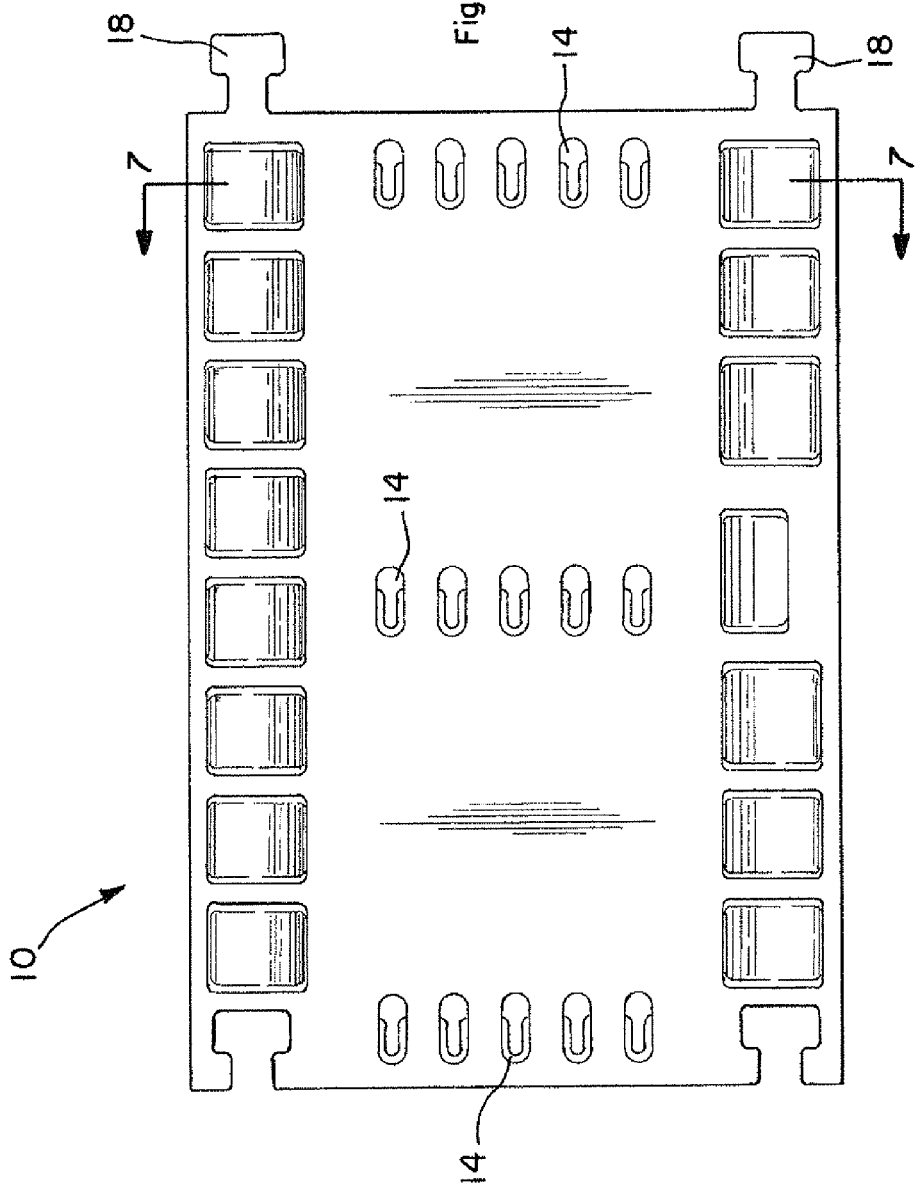

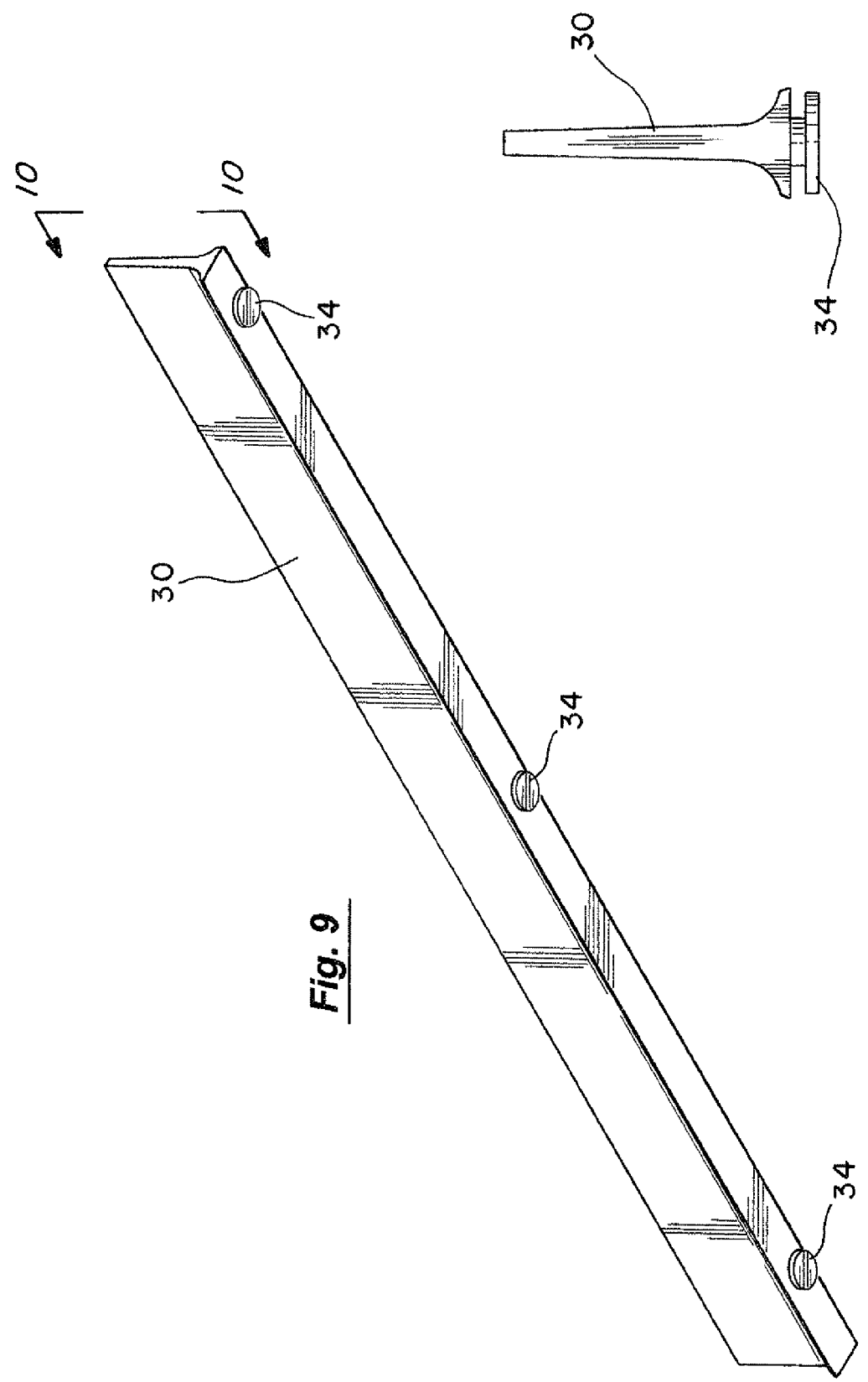

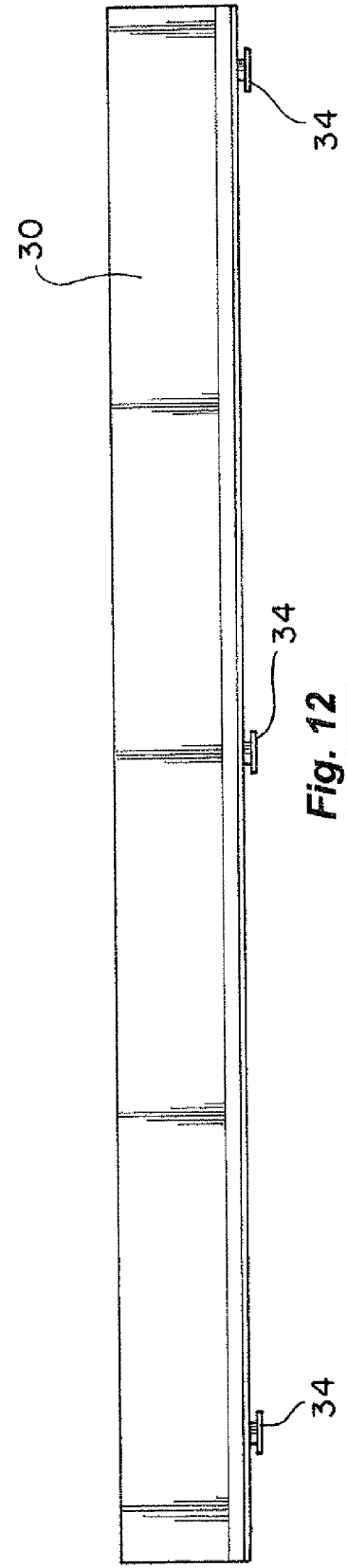
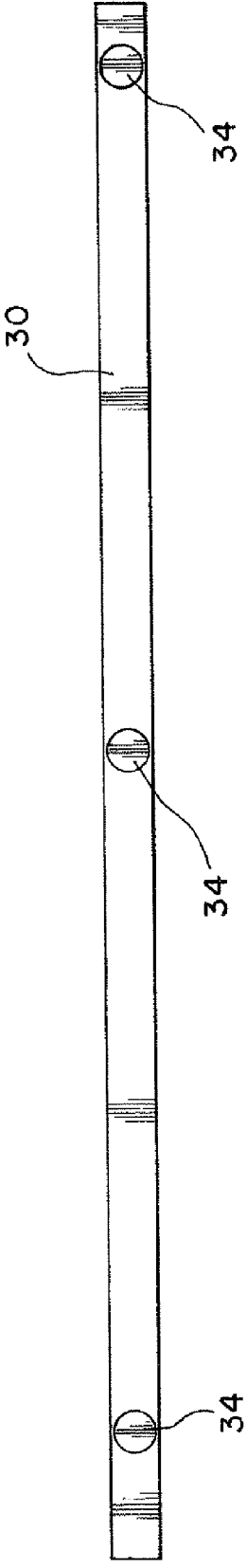
Fig. 11
Fig. 12
Fig. 13

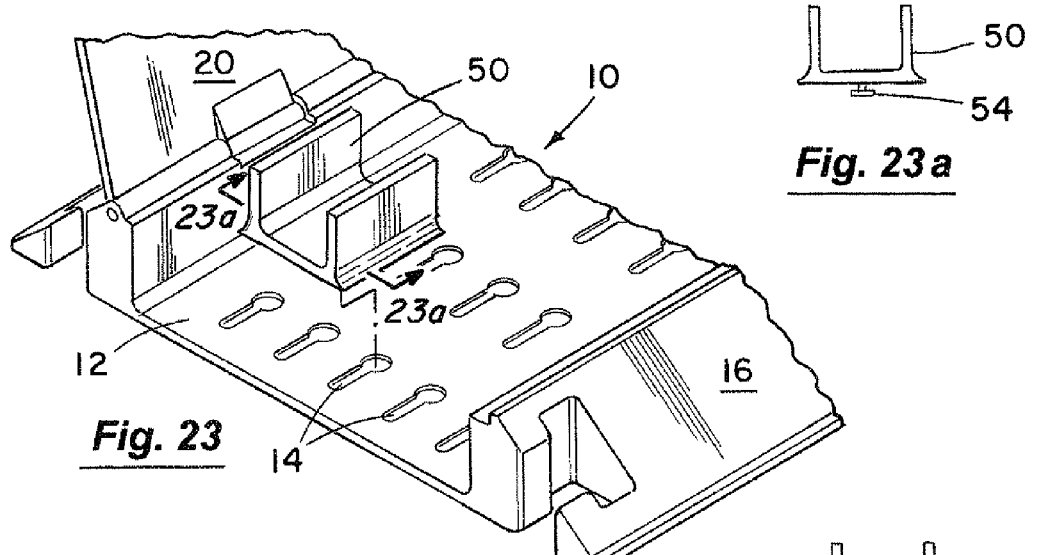
Fig. 23
Fig. 23a
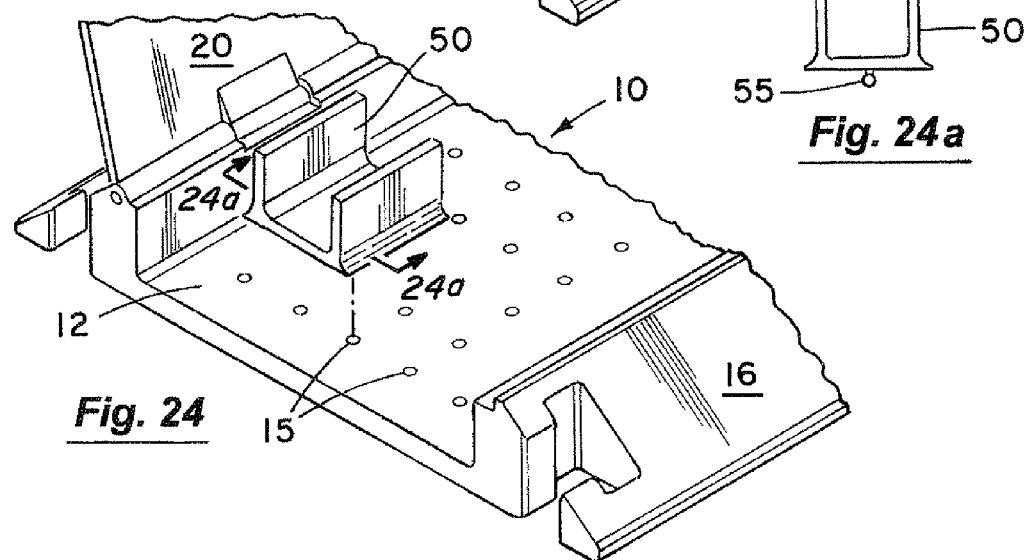
Fig. 24
Fig. 24a
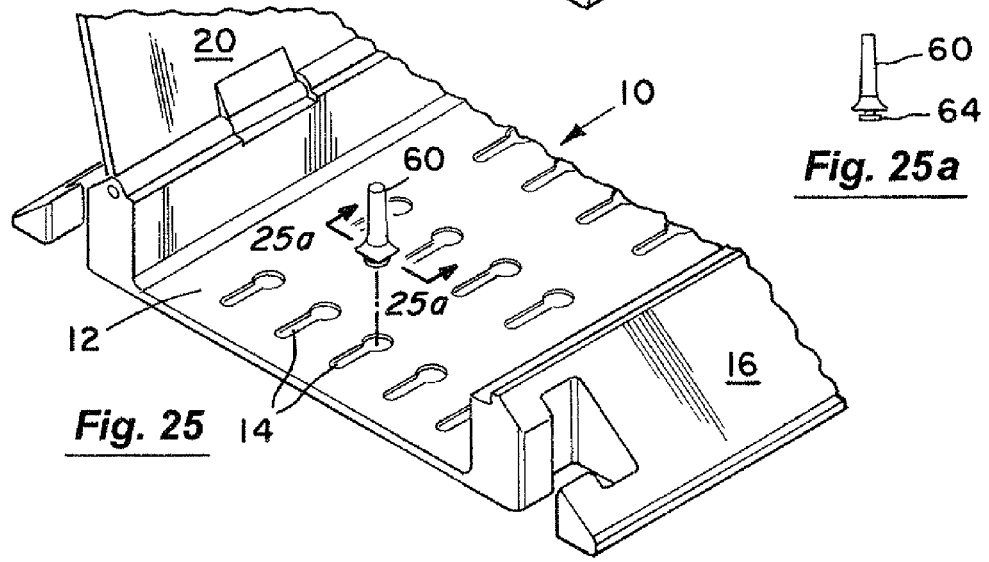
Fig. 25
Fig. 25a

CABLE PROTECTOR WITH REMOVABLE DIVIDERS

BACKGROUND OF THE INVENTION

1. Field of the Invention

The present invention relates generally to the field of cable protectors. More specifically, the present invention discloses a cable protector with removable dividers that can be used to divide the channel of the cable protector into as many tracks as desired for a particular job.

2. Statement of the Problem

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Many conventional cable protectors include one or more channels extending in parallel between the ends of the cable protector to receive the cables. Opposing side ramps or beveled edges extend laterally outward from both sides of the cable protector to allow vehicles to roll over the top of the cable protector, and to help minimize the risk of pedestrians tripping over the cable protector. Each cable protector typically includes sets of end connectors that enable a series of cable protectors to be attached together in a modular end-to-end fashion to any desired length.

The number of parallel channels provided by a given conventional cable protector is typically fixed. For example, conventional cable protectors are commercially available with one, two, three, four or more channels. However, situations often arise in which it becomes necessary to run additional cables after a series of cable protectors have already been assembled at a job site. Short of disassembling and replacing the cable protectors with other cable protectors having the desired number of channels, there is no way to address this problem with conventional cable protectors. Thus, there continues to be a need for a modular cable protector that can be readily modified in the field to divide the channel into a plurality of tracks for cables to meet the requirements of a particular job.

3. Solution to the Problem

The present invention addresses this shortcoming of the prior art by providing a modular cable protector in which removable dividers can be inserted into the channel of the cable protector from above to define a plurality of separate tracks for cables. The present invention enables such reconfigurations to be done in the field, in a simple and quick manner, by opening the lid of the cable protector to add or remove dividers from within the channel. It should be noted that this does not require that the cable protector be disassembled or disconnected from adjacent cable protectors. The cable protector can be configured either with individually-removable dividers (e.g. ribs) or removable, interchangeable trays having a number of dividers.

SUMMARY OF THE INVENTION

This invention provides a cable protector that includes a channel recessed into, and extending along the upper surface of a base. A number of dividers can be removably inserted into the channel from above to divide the channel into a plurality of tracks for carrying cables that can be inserted from above. Alternatively, a removable tray with a desired number of vertical dividers can be placed as a unit in the channel, instead of inserting individual dividers. A lid covers the channel and dividers to provide a surface for traffic over the cable protector. Sets of complementary fasteners, such a tabs and keyed slots, can be employed to removably secure the dividers in the channel of the cable protector.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a top view of base 10 of a cable protector corresponding to FIGS. 1 and 2.

FIG. 4 is a side elevational view of the base 10.

FIG. 5 is an end view of the base 10.

FIG. 6 is a bottom view of the base 10.

FIG. 7 is a cross-sectional view of the base 10.

FIG. 8 is a detail cross-sectional view of a keyed slot 14 in the floor of the channel 12 in the base 10.

FIG. 9 is a perspective view of an individual divider 30.

FIG. 10 is a end view of a divider 30.

FIG. 11 is a top view of a divider 30.

FIG. 12 is a side elevational view of a divider 30.

FIG. 13 is a bottom view of a divider 30.

FIG. 20a is a vertical cross-sectional view of one of the short trays 40 in FIG. 20.

FIG. 23 is a detail perspective view of a portion of the channel 12 of a cable protector showing attachment of a short U-shaped divider 50.

FIG. 23a is an end elevational view of the U-shaped divider 50 in FIG. 23.

FIG. 24 is a detail perspective view of a portion of the channel 12 of a cable protector showing attachment of a short U-shaped divider 50 with ball-and-socket connectors.

FIG. 24a is an end elevational view of the U-shaped divider 50 in FIG. 24.

FIG. 25 is a detail perspective view of a portion of the channel 12 of a cable protector showing attachment of a pin-shaped divider 60.

FIG. 25a is an side elevational view of the pin-shaped divider 60 in FIG. 25.

FIG. 27a is a detail vertical cross-sectional view of the assembled tray 40 and floor of the channel 12 corresponding to FIG. 27.

DETAILED DESCRIPTION OF THE INVENTION

Figure 1:
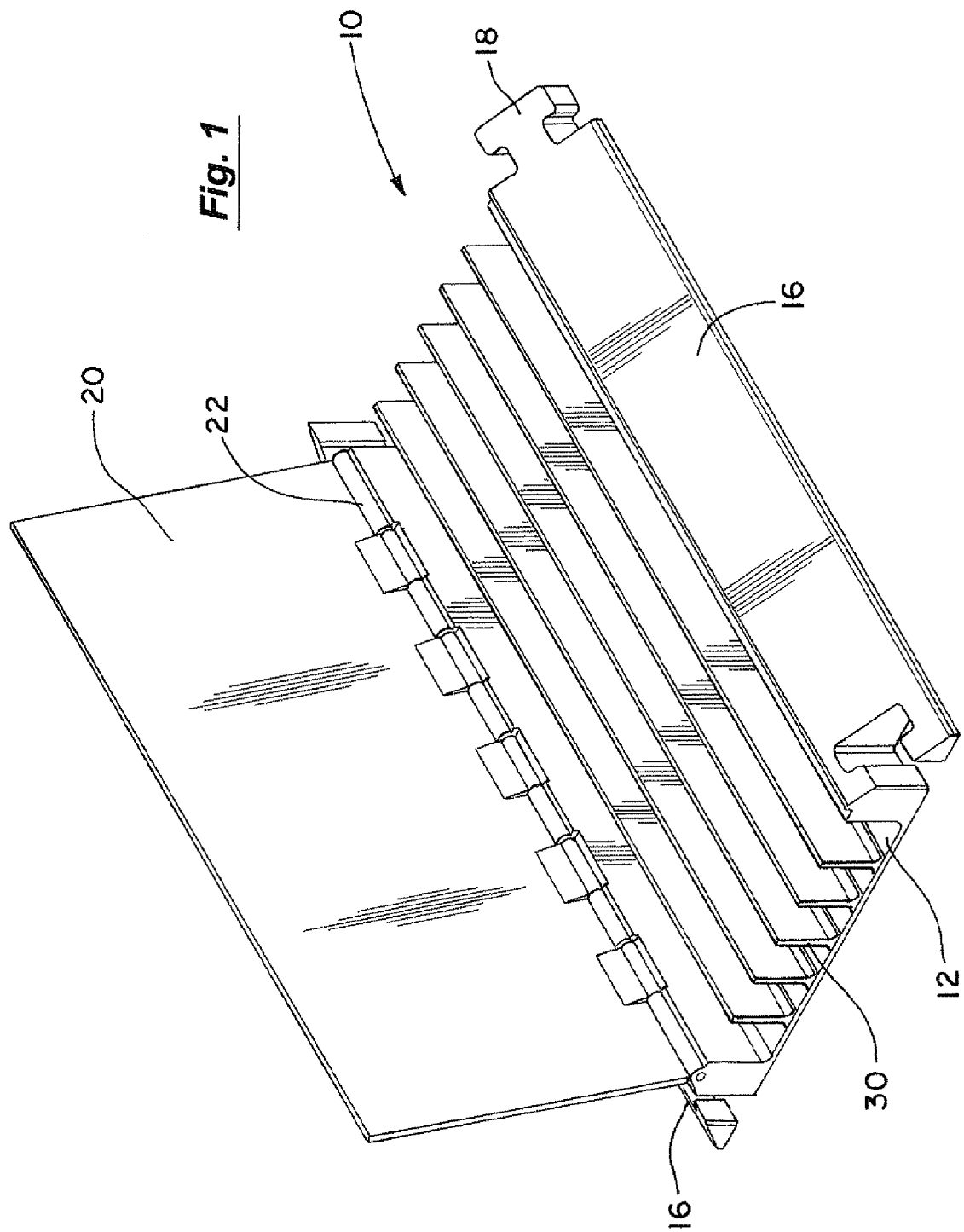
FIG. 1 is a perspective view of a cable protector embodying the present invention.

Turning to FIG. 1, a perspective view is shown of a modular cable protector embodying the present invention. The major components of the cable protector 10 are the base 10, lid 20 and a number of removable dividers 30. The base 10 has a bottom surface designed to lay on the ground, and an upper surface with at least one channel 12 for holding cables. The channel 12 is recessed into, and extends along the upper surface of the base 10 between the ends of the base 10. The base 10 can also include opposing side ramps 16 on either side of the channel 12 to facilitate wheeled traffic over the cable protector. FIG. 3 is a top view and FIG. 6 is a bottom view of the base 10. FIG. 4 is a side elevational view and FIG. 5 is an end view of the base 10.

The lid 20 covers the channel 12 to conceal and protect cables within the channel 12. The lid 20 also serves to provide a relatively flat surface across the top of the cable protector to facilitate wheeled traffic. The lid 20 can be manually pivoted about a hinge pin 22 between its open and closed positions. The lid 20 can also be designed to be completely removable.

Complementary sets of end connectors 18 on the ends of the base 10 can be used to removably engage the cable protector to two adjacent cable protectors. These end connectors 18 can be used to extend the assembly to include as many cable protectors in series as desired.

Figure 2:
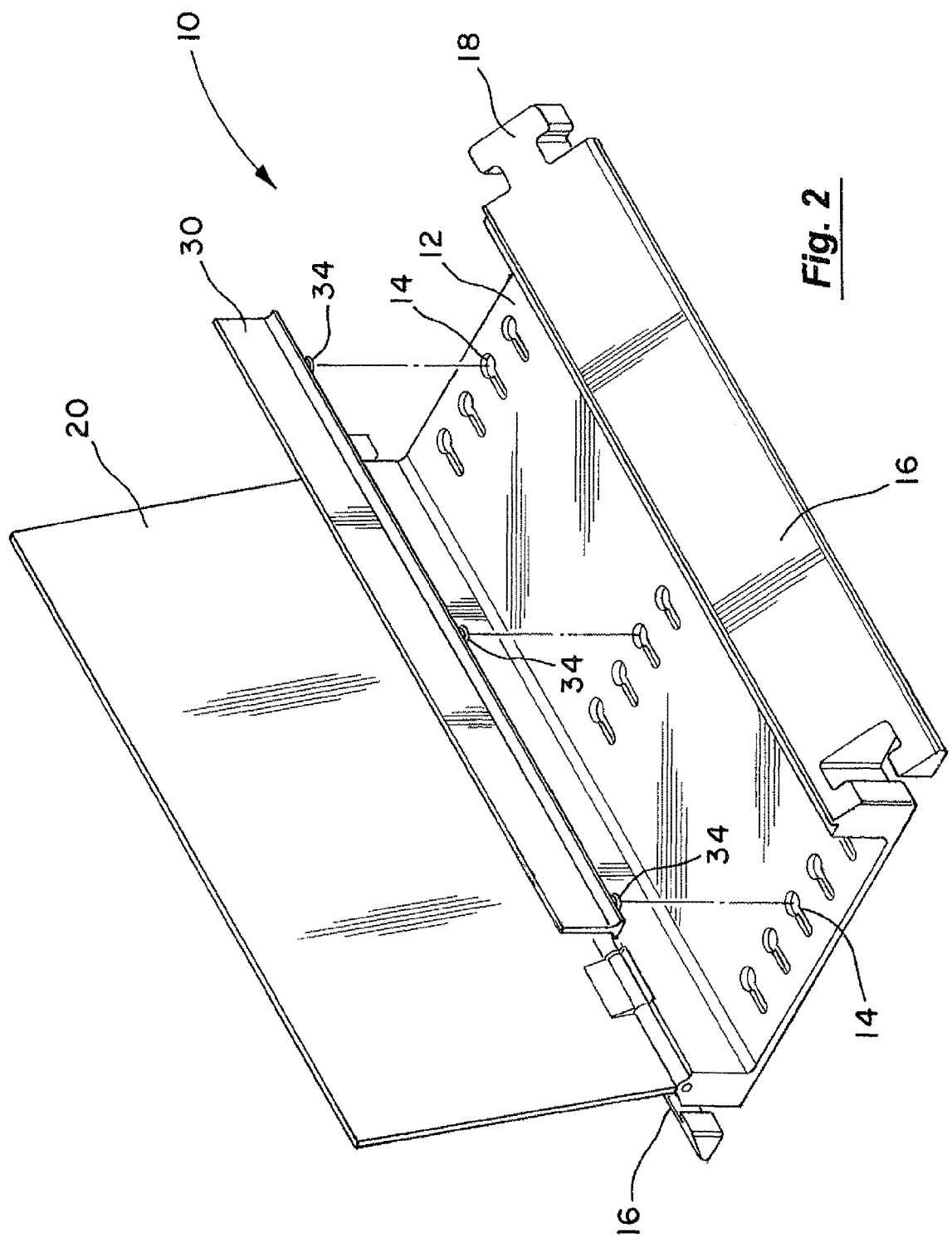
FIG. 2 is an exploded perspective view illustrating insertion of an individual divider 30 into the channel 12 of a cable protector.

FIG. 2 is an exploded perspective view of the base 10 showing installation of an individually-removable divider 30 in the channel 12 of the base 10. The floor of the channel 12 includes a pattern of keyed slots 14 that can be used to removably engage corresponding fastener tabs 34 extending from the bottom of a divider 30, as depicted in FIGS. 3 and 6. FIG. 7 is a cross-sectional view of the base 10 and FIG. 8 is a detail cross-sectional view of a keyed slot 14 in the floor of the channel 12. FIG. 9 is a perspective view of a divider 30. FIGS. 10-13 are end, top, side and bottom views, respectively, of a divider 30.

These tabs 34 and slots 14 serve as complementary sets of fasteners allowing a desired number of dividers 30 to be easily inserted into or removed from the channel 12 from above, without the need to disassemble the cable protector. For example, the configuration of the base 10 shown in FIG. 2 allows up to five dividers to be inserted into the channel 12. These dividers define up to six parallel tracks for holding cables. Similarly, cables can be easily placed into, or removed from each track by access from above, simply by opening the lid 20. This eliminates any need to disassemble the cable protector. It should be noted that any number of slots 14 could be configured in any desired pattern in the floor of the channel 12 to allow any desired number of dividers 30 to be installed, and thereby divide the channel 12 into any desired number of tracks. The tracks could be configured with equal or unequal widths The tracks are typically parallel to one another, and parallel to the axis of the channel. However, other track configurations are possible. For example, regions of the tracks could be designed with greater widths to accommodate plugs between cables. X-shaped or Y-shaped track configurations are also possible.

The embodiment of the present invention depicted in FIGS. 1-13 employs tabs 34 on the dividers 30 and keyed slots 14 in the floor of the channel 12 as complementary fasteners. However, other types or configurations of fasteners could be readily substituted. For example, the placements of the slots and tabs could be reversed, so that the channel 12 has a number of upwardly-extending tabs, and the dividers 30 have complementary slots or female fasteners The term "tab" as used in this application should be broadly construed to include any type of tab, button or other type of locking protrusion or fastener. Other types of male/female removable fasteners could employed. In addition, other types of complementary fasteners could be substituted, such as hook-and-loop fasteners, snaps, clips, magnetic fasteners, or track mechanisms that slidably engage one another, etc. Another alternative would be to provide fasteners only on the channel (e.g., tracks in the floor of the channel that engage the bottom edge of the dividers), or only on the dividers (e.g., clips or support structures on the ends of the dividers that removably engage the ends of the channel).

Figure 14:
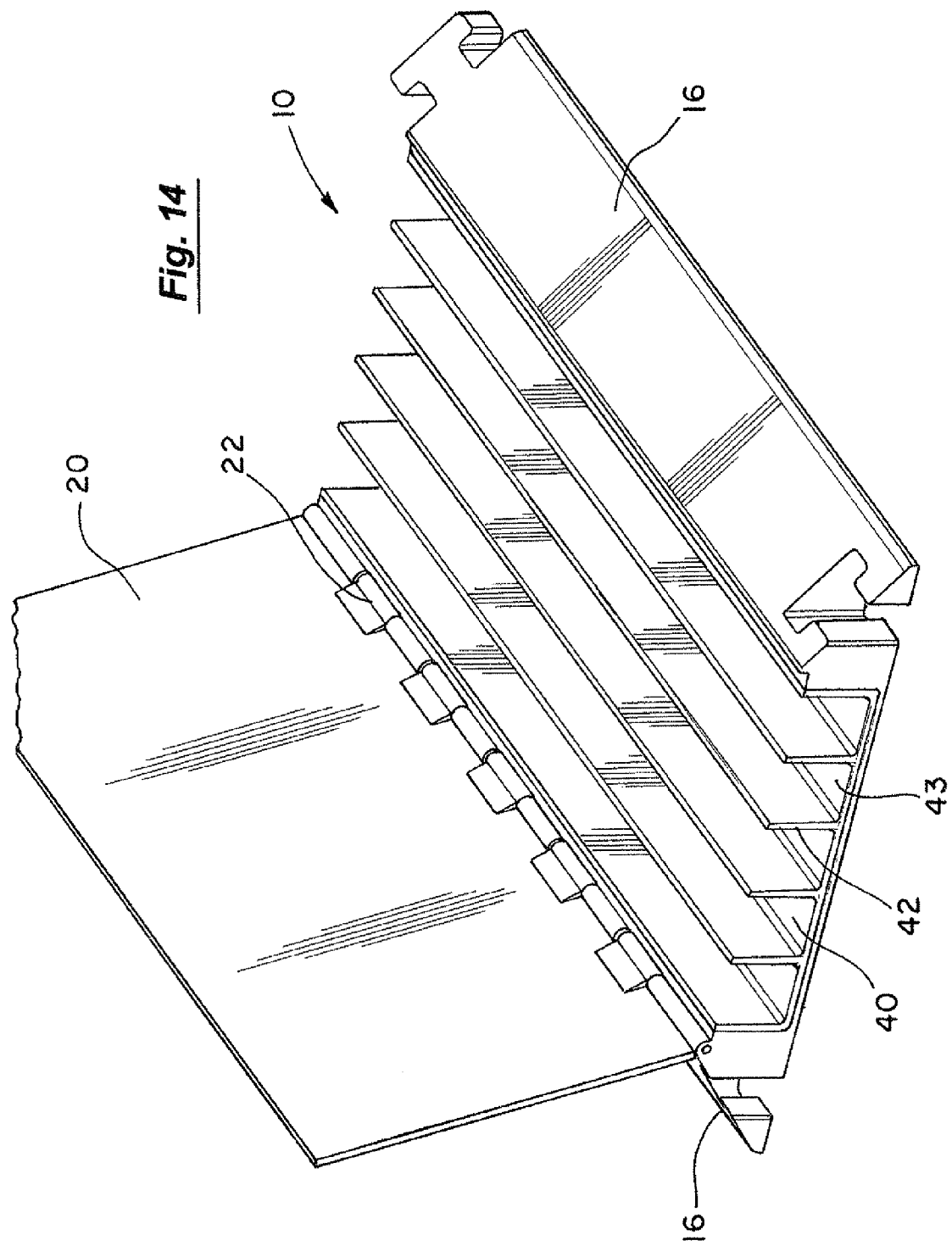
FIG. 14 is a perspective view of an embodiment of the present invention employing a removable tray 40 with a plurality of dividers 42.
Figure 15:
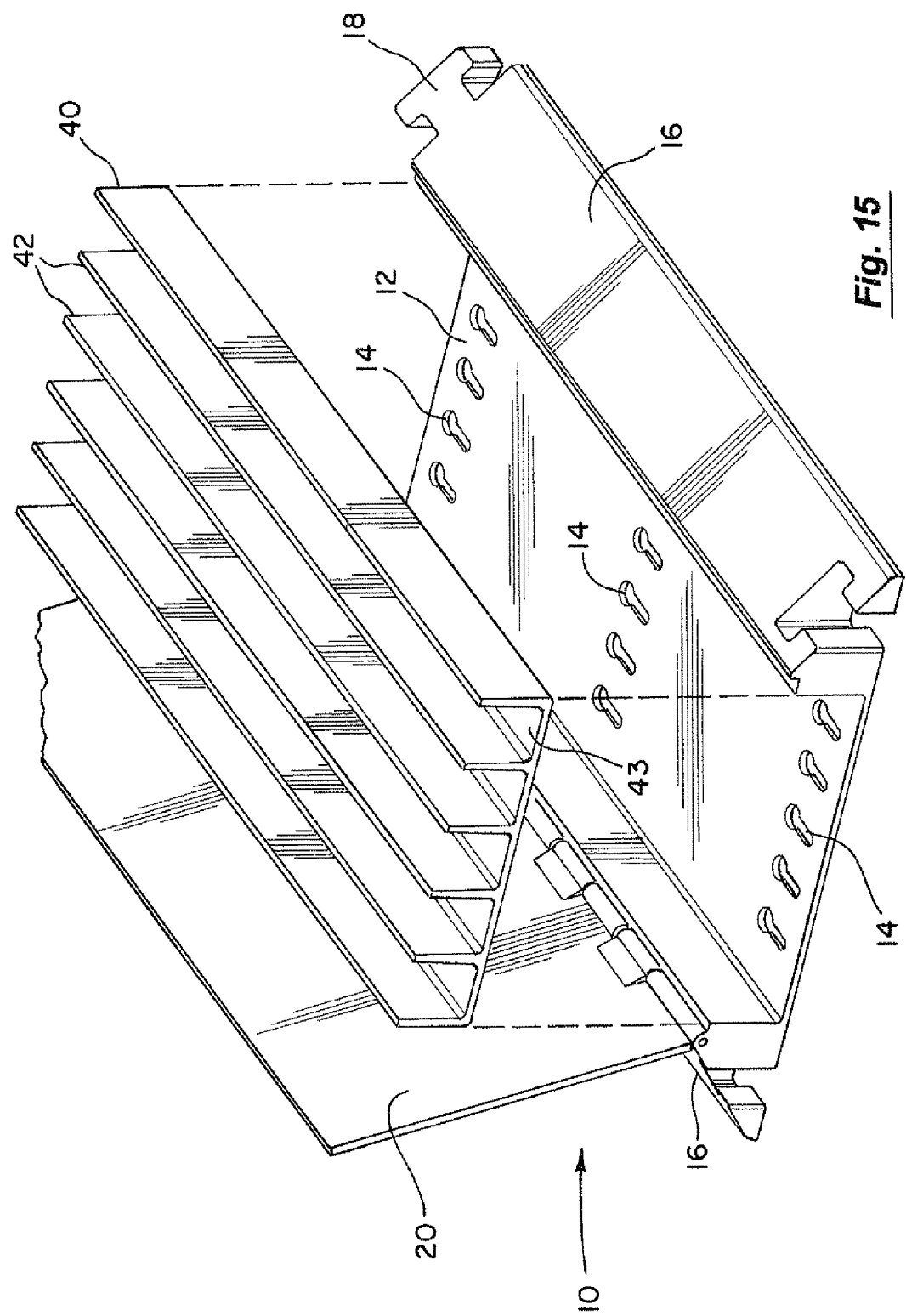
FIG. 15 is an exploded perspective view of the base 10 and removable tray 40 corresponding to FIG. 14.
Figure 16:
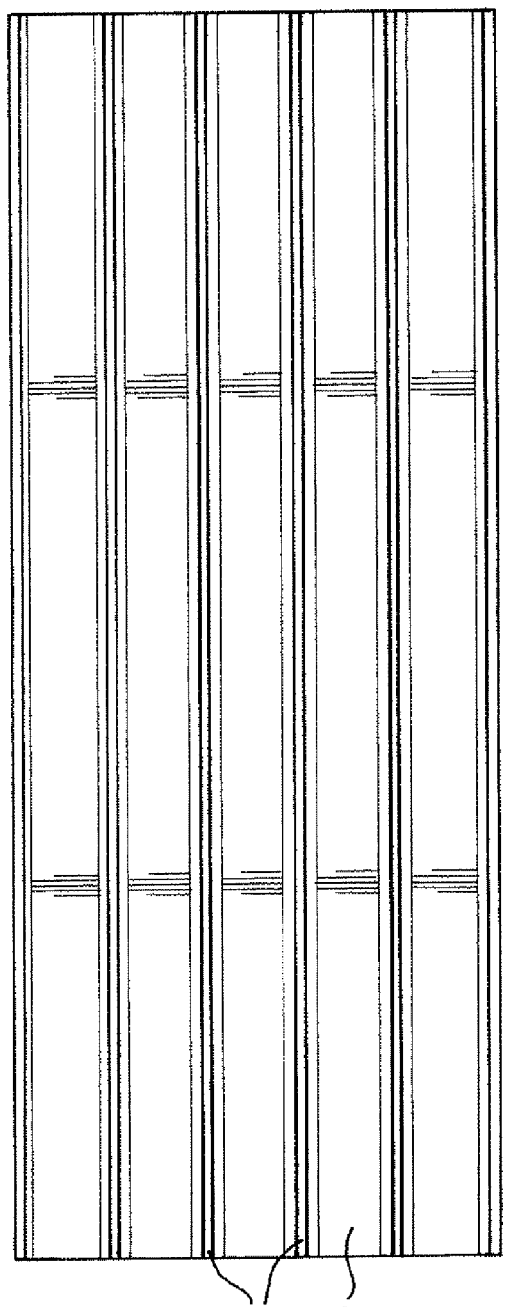
FIG. 16 is a top view of the tray 40.

FIGS. 14 through 19 illustrate another embodiment of the present invention using a removable tray 40 with a fixed set of vertical dividers 42 extending upward from the floor of the tray. The tray can be removably inserted as a unit into the channel 12 of the base 10 from above. Here again, the dividers 42 effectively divide the channel 12 of the base 10 into a plurality of tracks. FIG. 14 is a perspective view of this embodiment. FIG. 15 is an exploded perspective view of the base 10 and removable tray 40 corresponding to FIG. 14. FIGS. 16-19 are top, side, end and bottom views, respectively, of the tray 40 corresponding to FIGS. 14 and 15. In this embodiment, the tray 40 is interchangeable with other trays having a variety of divider configurations. The user can reconfigure the cable protector simply by removing the existing tray 40 and replacing it with a second tray having a desired number and configuration of dividers 42. Cables can be readily placed into the tracks or removed from the tracks by access from above by opening the lid 20 of the cable protector.

Figure 20:
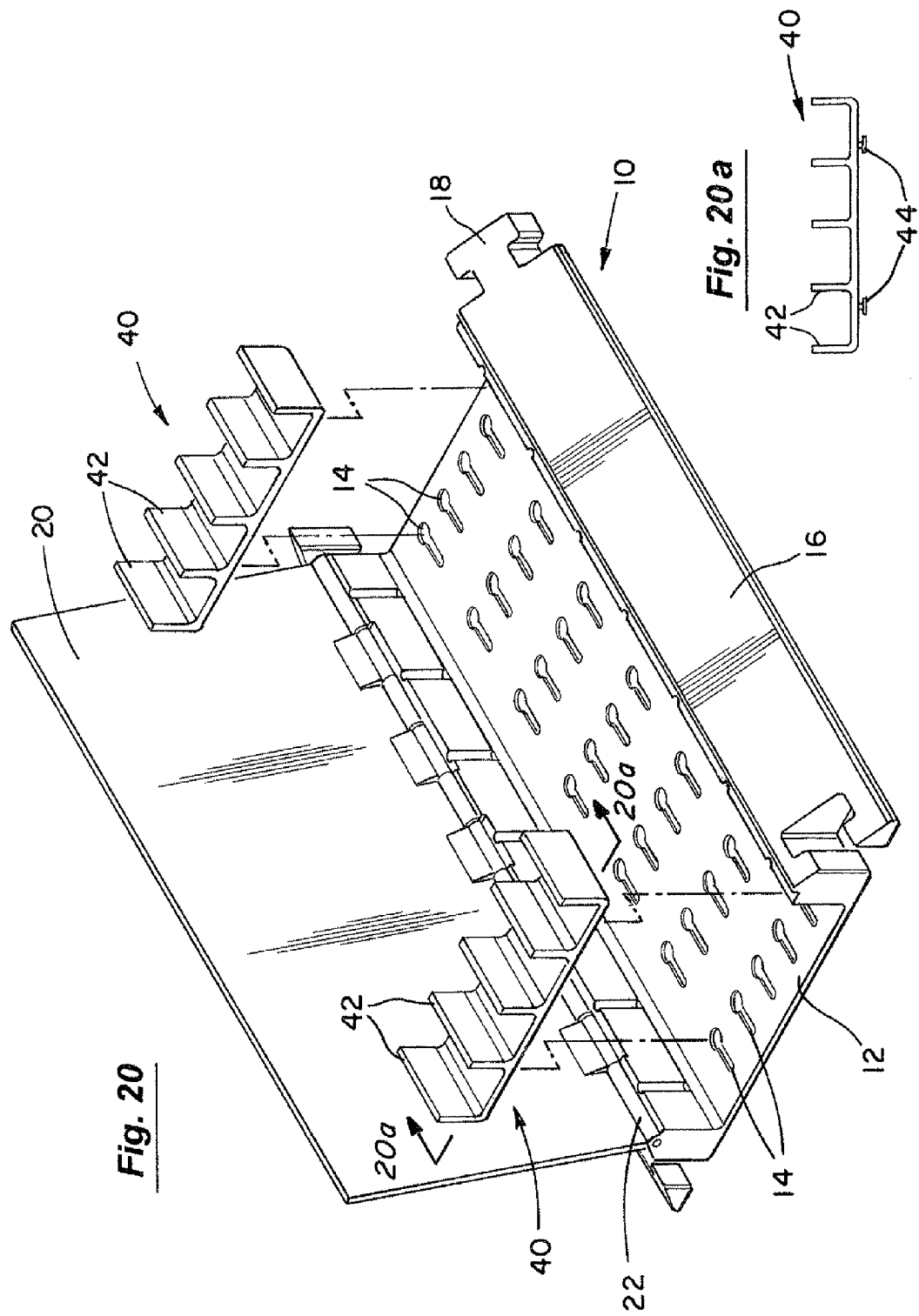
FIG. 20 is a perspective view of an embodiment in which a plurality of short trays 40 with dividers 42 are inserted into the channel 12 of the cable protector.
Figure 26:
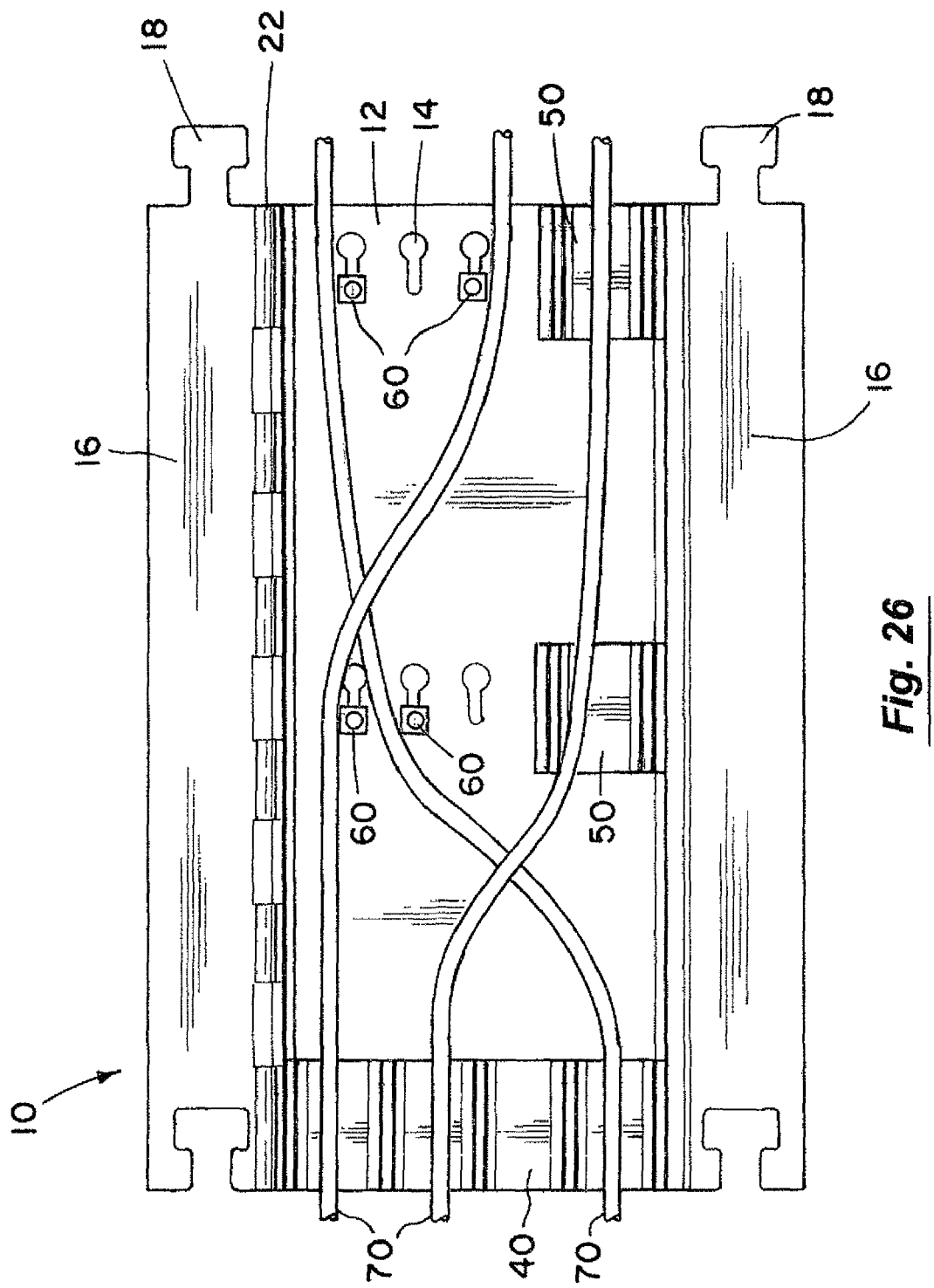
FIG. 26 is a top view of a cable protector with a variety of dividers 40, 50 and 60 installed in the channel 12 of the cable protector to allow cables 70 to be routed in any desired manner across tracks.

It should also be understood that the dividers 42 in this embodiment do not need to be complete, continuous vertical walls to adequately separate adjacent tracks. For example, the dividers 42 could be perforated or consist of a series of short segments, pins or fins extending upward from the floor of the tray 40 along a predetermined path. FIG. 20 is a perspective view showing an embodiment of a cable protector with short removable trays 40 having a plurality of dividers 42 that can be fastened to the keyed slots 14 in the floor of the channel 12. FIG. 20a is a vertical cross-sectional view of this short tray 40. FIGS. 23 and 23a show a short U-shaped divider 50 having a fastener tab 54 to removably engage a keyed slot 14 in the channel 12 floor. FIGS. 25 and 25a illustrate a pin-shaped divider 60 with a similar fastener tab 64. These embodiments allow cables 70 to be routed across tracks in any desired paths as shown in FIG. 26, and also provide extra room for plugs and cable connectors.

Figure 17:
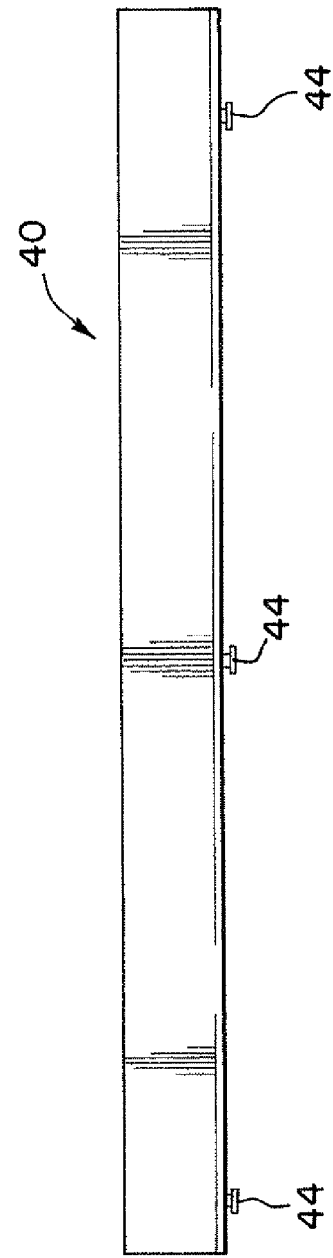
FIG. 17 is a side elevational view of the tray 40 corresponding to the FIG. 16.
Figure 18:
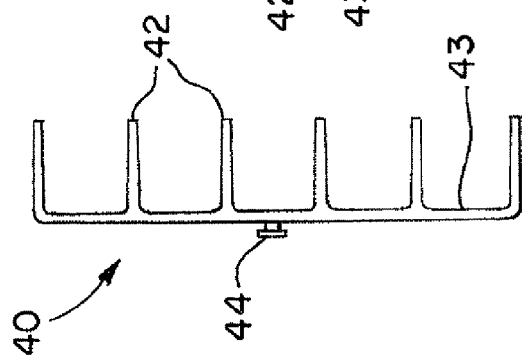
FIG. 18 is a end view of the tray 40 corresponding to the FIG. 16
Figure 19:
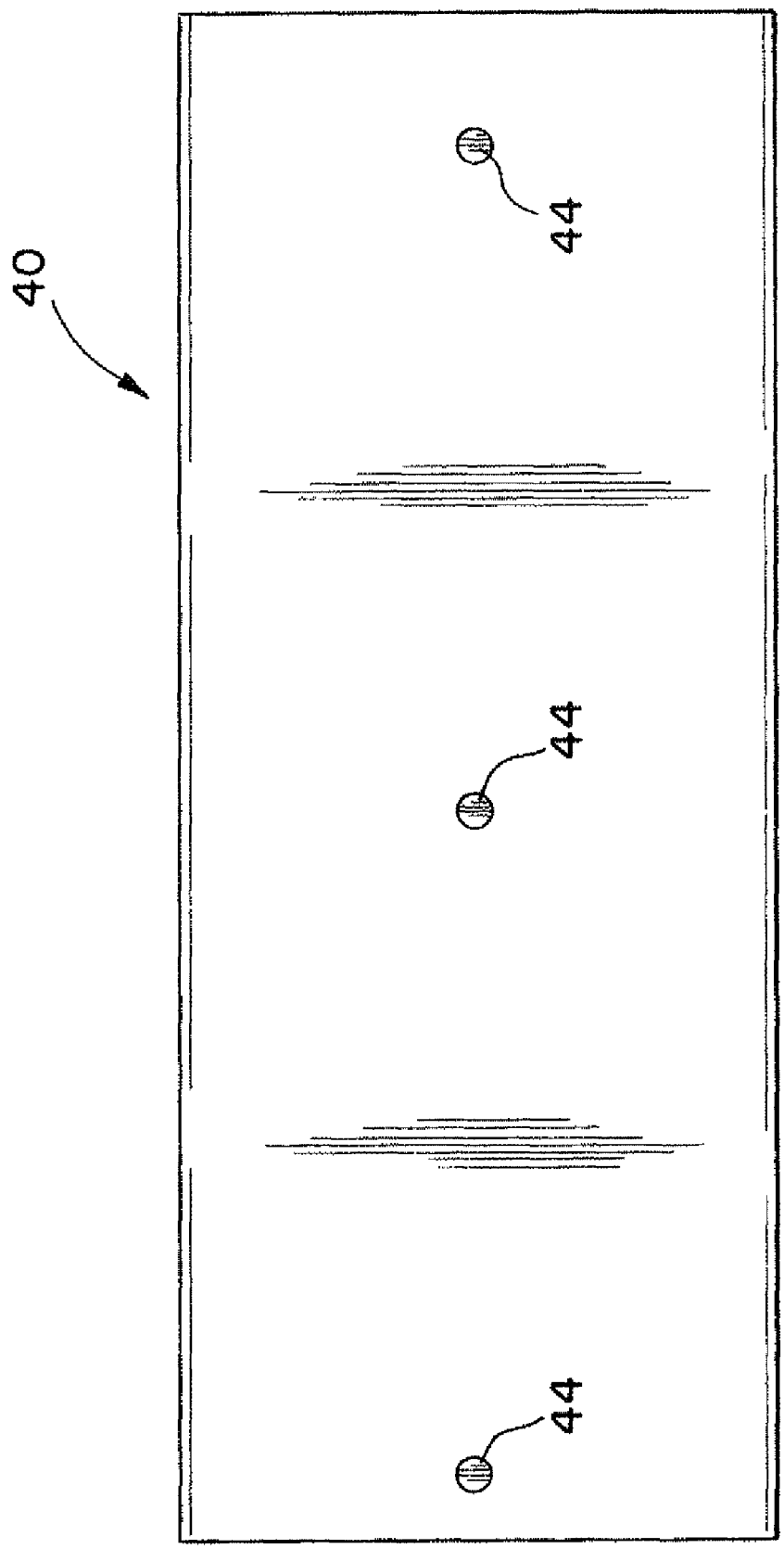
FIG. 19 is a bottom view of the tray 40.
Figure 21:
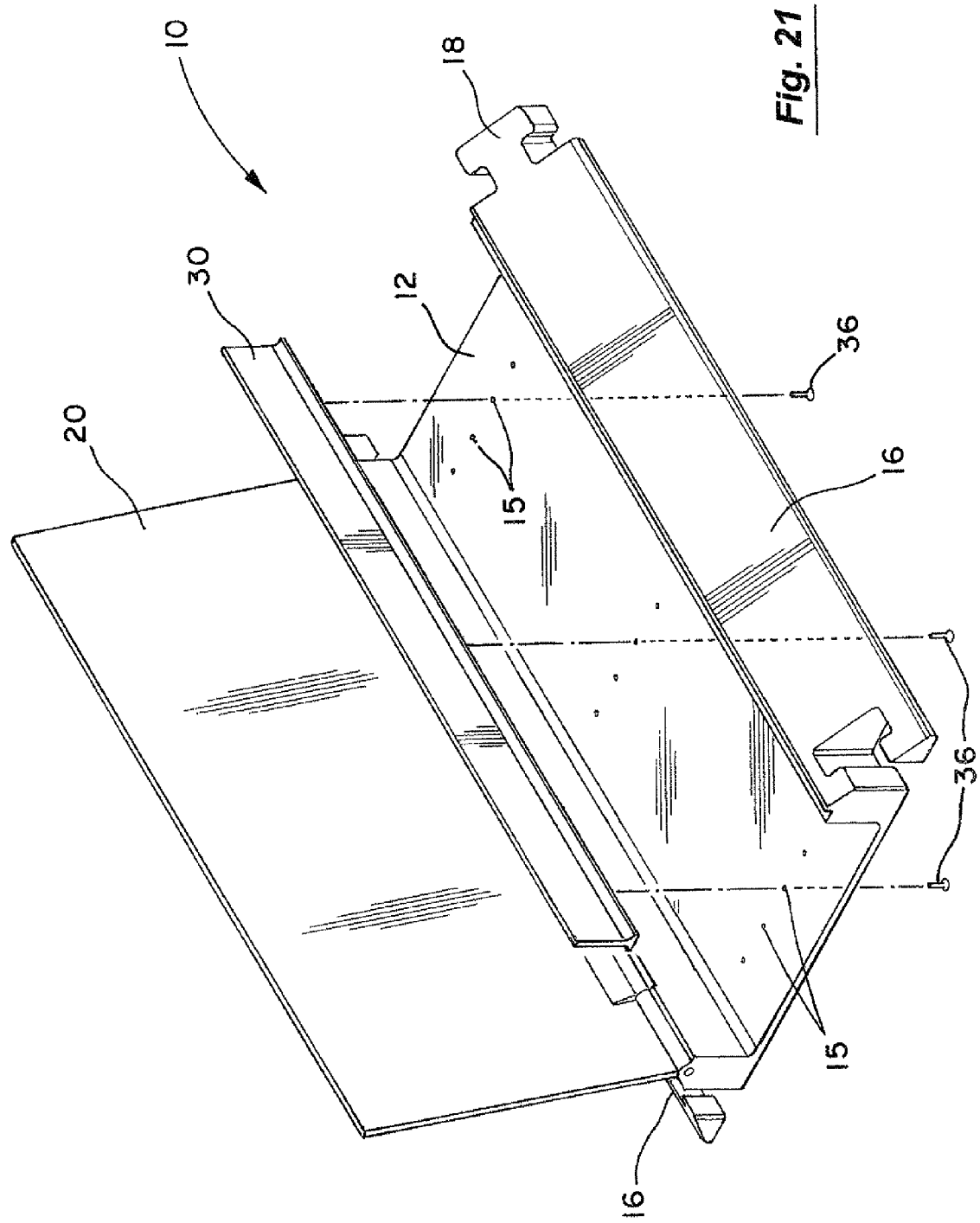
FIG. 21 is a perspective view of an embodiment in which a divider 30 is held in place by mean of screws or bolts 36 threaded upward through the bottom of a cable protector.
Figure 22:
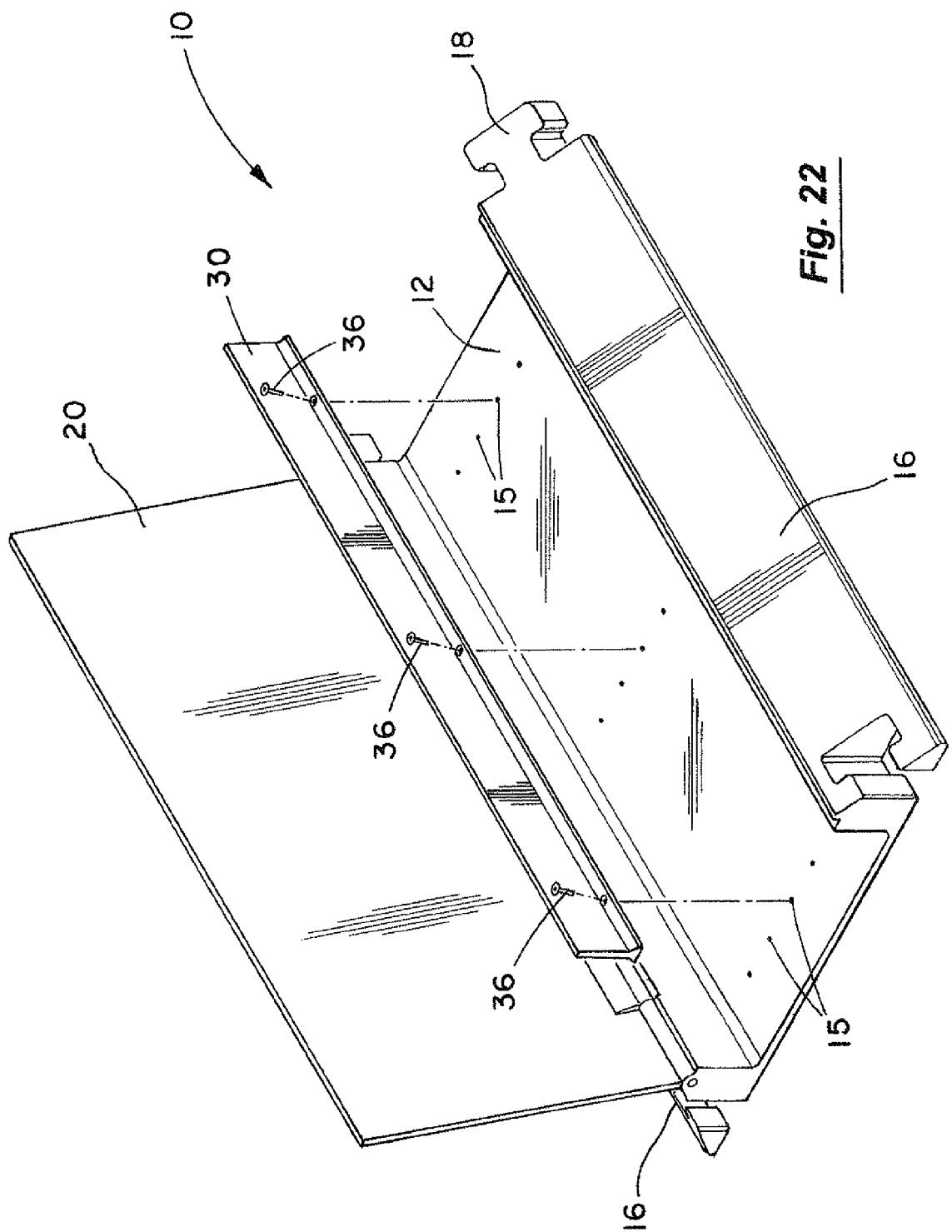
FIG. 22 is a perspective view of an embodiment in which a divider 30 is held in place by mean of screws or bolts 36 threaded downward through the divider 30 into holes 15 in the floor of the channel 12 of a cable protector.

As shown in FIGS. 15, 17 and 19, the underside of the floor 43 of the tray 40 is equipped with a series of tabs 44 that removably engage keyed slots 14 in the floor of the channel 12 of the base 10. These fasteners 14, 44 removably secure the tray 40 and its dividers 42 in place in the channel 12 of the base 10. Here again, other types of fasteners and/or fastener configurations could be readily substituted. For example, FIGS. 21 and 22 show examples of threaded fasteners 36 (e.g., bolts or screws) that can be used to removably secure dividers 42 in the channel 12 of the base 10. FIG. 21 is a perspective view of an embodiment in which a divider 30 is held in place by mean of screws or bolts 36 threaded upward through the bottom of a cable protector. FIG. 22 shows an embodiment in which a divider 30 is held in place by mean of screws or bolts 36 threaded downward through the divider 30 into holes 15 in the floor of the channel 12 of a cable protector.

Figure 27:
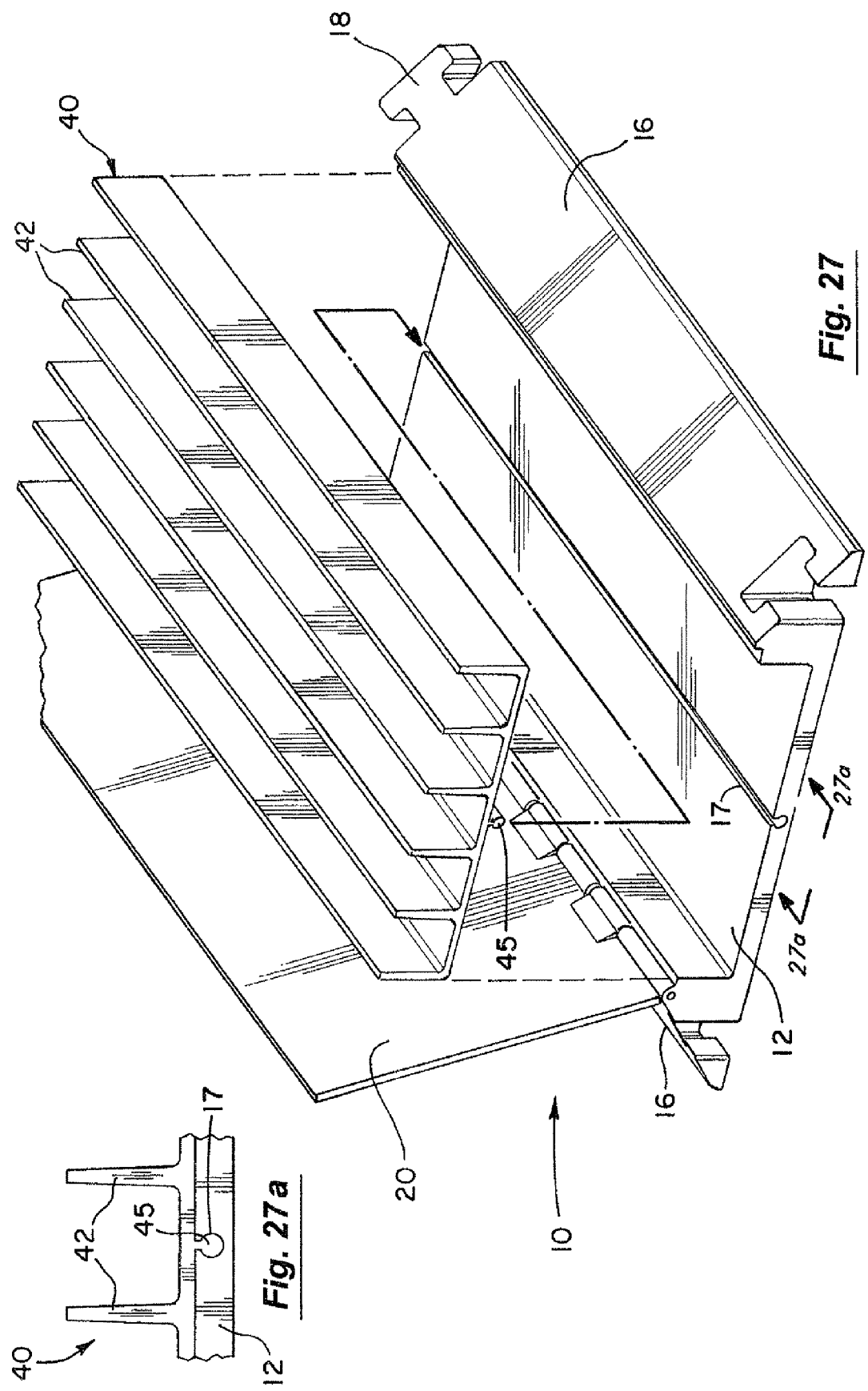
FIG. 27 is a perspective view of an embodiment of a cable protector in which a tray 40 can be removably attached by means of a rib 45 with a bead that slide into a corresponding slot 17 in the floor of the channel 12.
Figure 28:
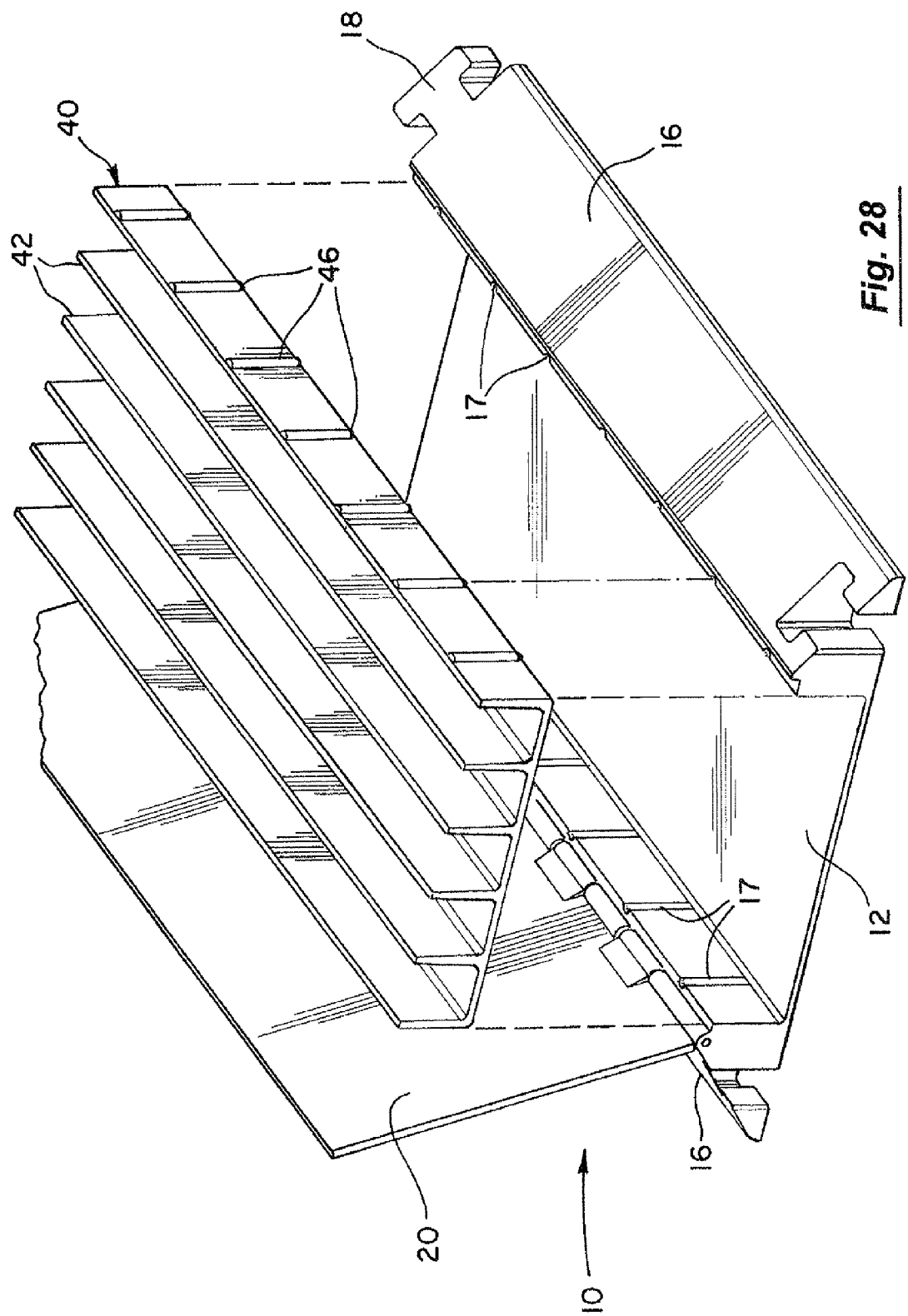
FIG. 28 is a perspective view of an embodiment of a cable protector having a series of vertical slots 17 on the side walls of the channel 12 that engage corresponding vertical ribs 46 protruding from the sides of the tray 40.
Figure 29:
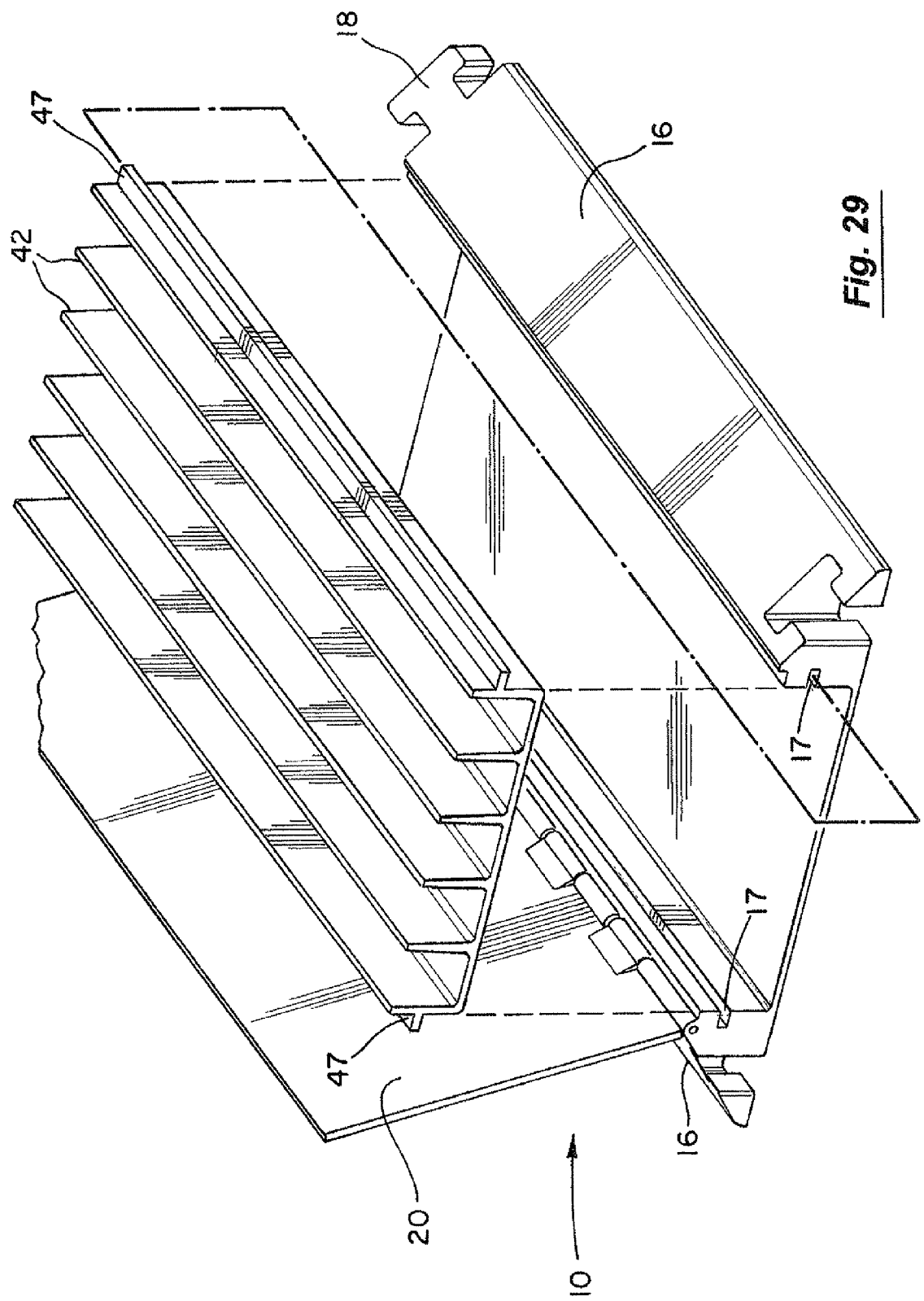
FIG. 29 is a perspective view of an embodiment of a cable protector having horizontal slots 17 on the side walls of the channel 12 that engage corresponding horizontal ribs or flanges 27 that extend outward from the sides of the tray 40.
Figure 30:
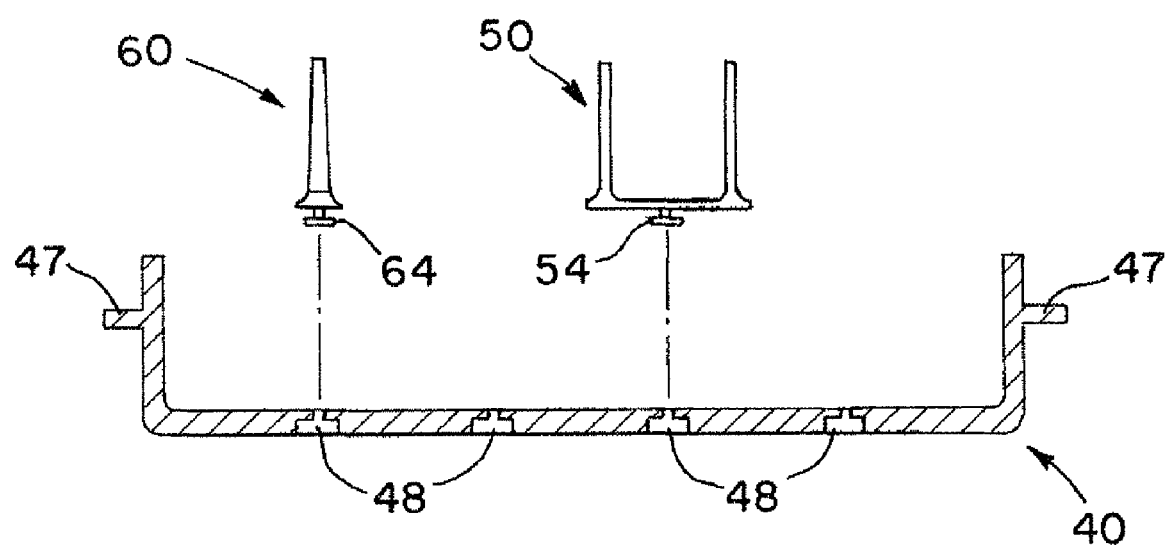
FIG. 30 is a vertical cross-sectional view of an embodiment of a tray 40, similar to that shown in FIG. 29, which also includes a plurality of keyed slots 48 in the floor of the tray 40 to removably engage corresponding fasteners 54, 64 on any of a variety of dividers 50, 60.

The trays 40 or individual divider ribs 42 could also be removably fastened in the channel 12 by means of other types of slots, guides or other fasteners. For example, FIGS. 24 and 24a illustrates an embodiment in which a U-shaped tray 40 can be removably attached to the cable protector base 10 by ball-and-socket fasteners 55, 15 that provide a snap-fit. FIGS. 27 and 27a illustrate an embodiment of a cable protector with a number of parallel fastener slots 17 running the length of the floor of the channel 12. The bottom of the tray 40 include a corresponding vertical rib 45 with a bead that can be inserted into the fastener slot 17 from either end of the cable protector. FIG. 28 depicts an embodiment of a cable protector having a series of vertical slots 17 on the side walls of the channel 12 that engage corresponding vertical ribs 46 protruding from the sides of the tray 40. FIG. 29 illustrates an embodiment of a cable protector having horizontal slots 17 on the side walls of the channel 12 that engage corresponding horizontal ribs or flanges 27 that extend outward from the sides of the tray 40. FIG. 30 is a vertical cross-sectional view of an embodiment of a tray 40, similar to that shown in FIG. 29, which also includes a plurality of keyed slots 48 in the floor of the tray 40 to removably engage corresponding fasteners 54, 64 on any of a variety of dividers 50, 60.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A cable protector comprising:
   a base having an upper surface;
   a channel recessed into, and extending along the upper surface of the base;
   at least one keyed slot in the channel; and
   a removable tray insertable into the channel from above, having at least one vertical divider for dividing the channel into a plurality of tracks and carrying cables inserted from above, said tray having at least one tab for removably engaging the keyed slot in the channel.

2. The cable protector of claim 1 further comprising a lid covering the channel and dividers to provide a surface for traffic over the cable protector.

3. The cable protector of claim 1 further comprising end connectors for removably connecting a plurality of cable protectors in series.

4. The cable protector of claim 1 further comprising opposing side ramps on either side of the channel.

5. A cable protector comprising:
   a base having an upper surface;
   a channel recessed into, and extending along the upper surface of the base; said channel having a floor with a pattern of keyed slots; and
   at least one divider having at least one complementary tab along its bottom edge for removably engaging at least one keyed slot on the floor of the channel to thereby divide the channel into a plurality of tracks for holding cables inserted from above.

6. The cable protector of claim 5 wherein the divider comprises a rib.

7. The cable protector of claim 5 wherein the divider comprises a plurality of pins.

8. The cable protector of claim 5 further comprising a lid covering the channel and dividers to provide a surface for traffic over the cable protector.

9. The cable protector of claim 5 further comprising end connectors for removably connecting a plurality of cable protectors in series.

10. The cable protector of claim 5 further comprising opposing side ramps on either side of the channel.

\* \* \* \* \*